United States Patent [19]

Takasaki et al.

[11] 4,410,980
[45] Oct. 18, 1983

[54] TIME DIVISION MULTIPLEXING SYSTEM

[75] Inventors: Yoshitaka Takasaki, Tokorozawa; Mitsuo Tanaka, Ohme, both of Japan

[73] Assignee: Hitachi, Ltd., Tokyo, Japan

[21] Appl. No.: 289,106

[22] Filed: Jul. 31, 1981

[30] Foreign Application Priority Data

Aug. 1, 1980 [JP] Japan ............................. 55-104988

[51] Int. Cl.³ .............................................. H04J 3/18
[52] U.S. Cl. ..................................... 370/109; 370/84;
370/102
[58] Field of Search ................. 370/109, 102, 91, 84;
179/15.55 T; 375/114

[56] References Cited

U.S. PATENT DOCUMENTS

| 3,636,524 | 1/1972 | Holland | 370/109 |
|---|---|---|---|
| 4,132,862 | 1/1979 | Ferret et al. | 370/102 |
| 4,174,465 | 11/1979 | Meares et al. | 370/109 |
| 4,330,856 | 5/1982 | Takasaki et al. | 370/109 |

Primary Examiner—Gerald L. Brigance
Attorney, Agent, or Firm—Antonelli, Terry & Wands

[57] ABSTRACT

In a time division multiplexing system for multiplexing a plurality of channels having mutually-independent bit rates, the improvement wherein the pulse signals of each channel are converted into codes so that the information "1" is represented by a pulse having a width of two consecutive transmission clock periods ("0,0" or "1,1") the information "0" is represented by a pluse having a width of a single transmission clock period ("0" or "1"), and polarities of adjacent pulses are always different from each other; the pulse signals are compressed time-wise in a frame unit; and a frame synchronizing signal and a channel synchronizing signal, each consisting of marks or spaces having a duration of at least three consecutive transmission clock periods, are added to the intervals between the time-compressed frames to thereby perform time division multiplexing.

10 Claims, 10 Drawing Figures

TIME DIVISION MULTIPLEXING SYSTEM

FIELD OF THE INVENTION

This invention relates to a multiplex transmission system and, more specifically, to a system which time-division multiplexes and transmits digital signals from a plurality of asynchronous channels.

BACKGROUND OF THE INVENTION

The transmission of digital signals derived from a plurality of signal sources by multiplexing them in the time division arrangement is well known. In the well-known time division multiplexing systems, however, the digital signals of a plurality of channels to be subjected to the time division multiplexing generally must have either the same bit rate or bit rates which are an integral multiple of one another. Otherwise, respective channel signals have to be synchronized by using a technique such as a start-stop system. Accordingly, in the transmission system that employ heretofore-known time division multiplexing techniques, the kinds of signals to be multiplexed are limited, and circuits and apparatus to be incorporated in a particular system must be designed exclusively for use in the system and thus cannot be applied to other systems having different clock rates.

On the other hand, recent developments in fiber optical transmission has made it possible to implement inexpensive transmission lines incorporating extremely-high bit rates, and the demands for transmitting various signals from many different kinds of signal sources, as well as signal processors, such as electronic computers, have become strong. In such a case, the use of time division multiplexing techniques to effectively combine a plurality of these signal channels will be required to realize a flexible and economical communications network. However, conventional time division multiplexing techniques make it necessary to convert the respective signals from the plurality of asynchronous channels into synchronous digital signals and also require use of transmission lines which are especially designed to provide clock rates for such particular application, which seems to entail many practical problems.

To eliminate the above-mentioned problem, there has been previously proposed a transmission system capable of direct time division multiplex transmission of asynchronous digital signals from a plurality of channels having arbitrary clock rates, as disclosed in U.S. application Ser. No. 118,919, filed Feb. 6, 1980, entitled "Digital Signal Communication System", now U.S. Pat. No. 4,330,856, issued May 18, 1982. In this system, the digital signals to be transmitted are converted into a composite pulse stream having a faster transmission clock rate than that of respective original signals to sequentially multiplex the original digital signals from a plurality of asynchronous channels in the time division arrangement.

Though this prior communication technology is efficient in time division multiplexing digital signals from a plurality of asynchronous channels having different bit rates, it is necessary to process and arrange the respective channel signals in the order of the clock rates of the original digital signals to be multiplexed. The communication technology on which this prior system is based also suffers from another practical problem, that is, burst signals, such as alarm signals, that appear sporadically cannot be multiplexed.

SUMMARY OF THE INVENTION

It is therefore an object of the present invention to provide a communication system which is capable of multiplexing and transmitting a plurality of digital signals having arbitrary clock rates in a time division arrangement irrespective of their clock rate.

It is another object of the present invention to provide a time division multiplex communication system which is capable of transmitting multiplexed signals using existing regenerative repeaters and which also is capable of demultiplexing the received signal with ease.

It is still another object of the present invention to provide a communication system which is capable of time division multiplexing burst signals.

To accomplish the above-mentioned objects, the present invention provides a time division multiplexing system which sequentially converts each digital signal in a predetermined period (hereinafter referred to as a "frame"), into a time-compressed digital signal, adds a frame synchronizing signal or a channel synchronizing signal to the time-compressed digital signal for identification, and carries out time division multiplexing of the time-compressed digital signals within the above-mentioned frame period.

In order to significantly simplify the demultiplexing operation, the frame synchronizing signals and the channel synchronizing signals, as well as the original information signals ("0" or "1"), are coded into different digital run lengths of mark or space portions, before being time compressed and multiplexed. Digital run lengths are defined by intervals between two adjacent transients (from mark to space or space to mark) that have time durations which are integral multiples of the transmission clock periods.

As described above, in the time division multiplexing system in accordance with the present invention, the code conversion applied to information signals, as well as the frame and channel synchronizing signals, makes it possible to easily multiplex and transmit signals from a plurality of continuous signals having arbitrary clock rates, as well as burst signals.

Furthermore, because the synchronizing signals and the information signals (conversion code) can be differentiated in terms of the differences in the numbers of consecutive spaces or marks, it is not necessary to use multi-level pulses. Accordingly, existing repeaters designed for regeneration of two-level pulses can be used as such with the present invention.

These and other objects and features of the present invention will become more apparent from the following detailed description of embodiments thereof to be read in conjunction with the accompanying drawings.

DESCRIPTION OF THE PREFERRED EMBODIMENTS

Figure 1:
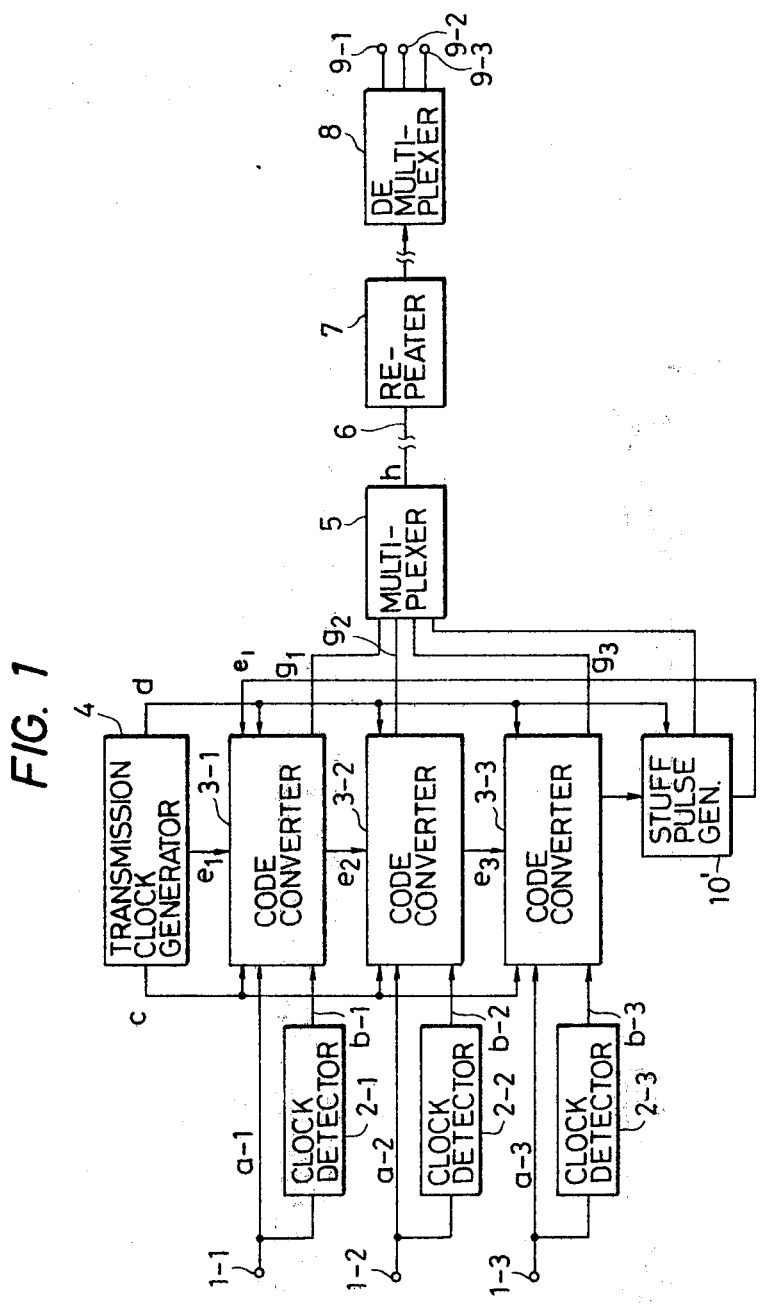
FIG. 1 is a block diagram showing the overall construction of an embodiment of the time division multiplexing system in accordance with the present invention.

FIG. 1 is a block diagram showing the overall construction of an embodiment of the time division multiplexing system in accordance with the present invention. In order to simplify the explanation, the diagram shows an example in which only three channels are to be multiplexed.

Digital signals $a_1$, $a_2$ and $a_3$ of three channels having different clock rates ($f_1$, $f_2$, $f_3$) are applied to local code converters 3-1, 3-2 and 3-3 via input terminals 1-1, 1-2 and 1-3, respectively. Though these digital signals may be either NRZ two-level signals or RZ two-level signals, the following explanation of the embodiments will be made by reference to NRZ two-level digital signals. Here, the expression "different clock rates" does not mean that each clock rate varies, but means that the clock rates of the respective original signals are asynchronous with respect to each other.

The code converters 3-1, 3-2 and 3-3 are connected to receive clock signals b-1, b-2 and b-3 of each channel from clock signal detectors 2-1, 2-2, 2-3, a transmission clock signal C from a transmission clock signal source 4, channel control signals $e_1$, $e_2$ and $e_3$ to be described elsewhere, and a frame control signal d, also derived from generator 4. Each code converter converts the code of the signal from each channel for each frame and generates time-compressed output signals $g_1$, $g_2$ and $g_3$. These output signals are converted into a time division multiplexed transmission signal h by means of a multiplexer 5.

The transmission signal is applied to a decoder or demultiplexer 8 of a receiving portion via a line 6 and, if necessary, via an intermediate repeater 7. In the reverse manner to the operation of the transmitting portion, the demultiplexer separates the time division multiplexed signals and outputs the demultiplexed signals of the respective channels from its output terminals 9-1, 9-2 and 9-3.

Figure 2:
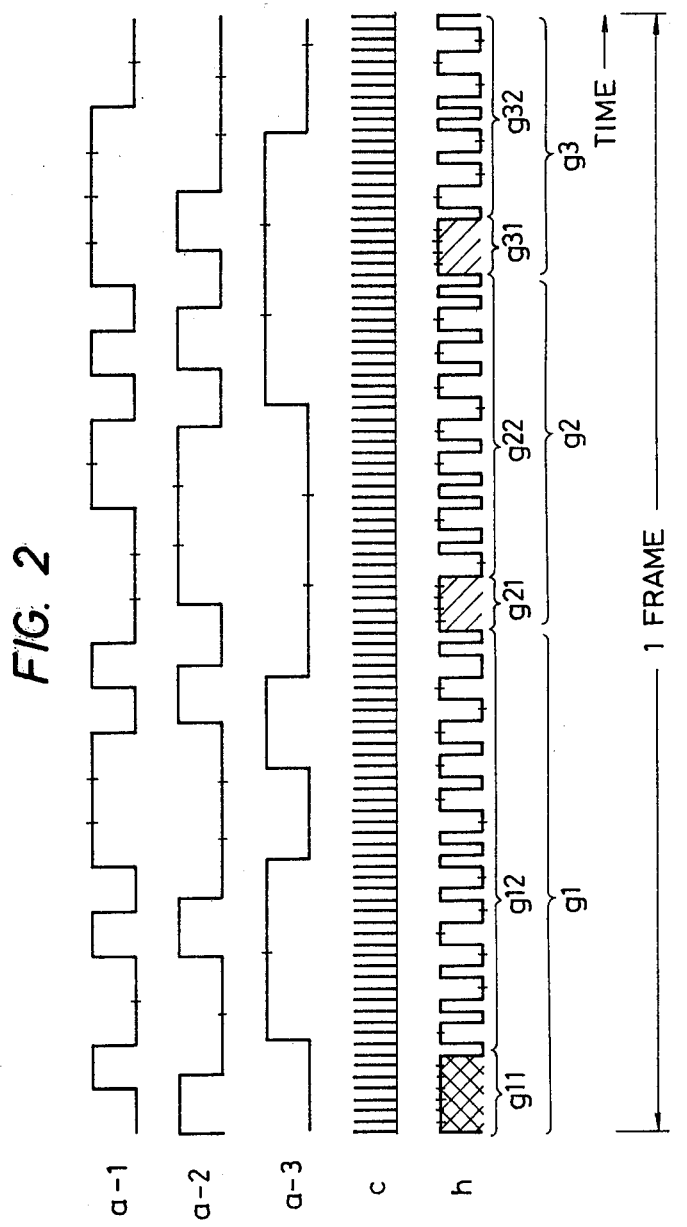
FIG. 2 is a signal waveform diagram useful for explaining the operation of time division multiplexing in the above-mentioned embodiment.

FIG. 2 shows the state of the signals in one frame period in the above-described embodiment. The original NRZ digital channel signals $a_1$, $a_2$ and $a_3$ are code-converted in accordance with the following rules. Namely, an input information signal "1" is converted into two consecutive marks or spaces ("0,0" or "1,1") and an information signal "0" is converted into a single mark or space ("0" or "1"). Selection of whether to incorporate a mark or space in the output of the converter is made in such a way as to locate each converted signal between adjacent transitions from a mark to a space or a space to a mark. Since the transmission clock rate is set at a level that is by far higher than the clock rate of each original channel, signals after conversion result in time compressed pulse streams, as illustrated in $g_{12}$ in the drawing. To identify respective frames, a frame synchronizing signal $g_{11}$ is added to this signal, thereby producing an output signal $g_1$. The same procedures are effected for the channel signals a-2 and a-3 so as to obtain output signals $g_2$ and $g_3$ by means of the local code converters 3-2 and 3-3, respectively. Since $g_{11}$ is added for frame identification in the output signal $g_1$, channel synchronizing signals $g_{21}$ and $g_{31}$ are also added for channel identification, respectively, in the output signals $g_2$ and $g_3$. The duration (the number of the consecutive marks or spaces) of these frame synchronizing signals and channel synchronizing signals are set to 7 and 5 time slots, respectively, in order to distinguish them from the aforementioned digital signals for data transmission. The characterizing feature of these synchronizing signals resides in that the number of the consecutive marks or spaces is employed for identification without using special pulses having different amplitudes.

In order for the above-mentioned operation to be carried out, the following relation must be satisfied:

$$N_F \geqq \alpha \frac{f_1 + f_2 + \ldots + f_n}{f_0} N_F + N_{FP} + (n - 1)N_{CP}$$

where n: number of plural channels to be multiplexed,
$f_0$: transmission clock rate,
$f_1, f_2, \ldots f_n$: signals clock rate of each original channel,
$N_F$: number of transmission clock pulses in a frame,
$N_{FP}$: number of pulses of frame synchronizing signal,
$N_{CP}$: number of pulses of channel synchronizing signal,
$\alpha$: clock rate increment ratio due to code conversion.

Hence, $$f_0 \geqq \alpha \frac{1}{1 - n_{FP} - (n - 1)n_{CP}} (f_1 + f_2 + \ldots + f_n) \text{ where}$$

$$n_{FP} = \frac{N_{FP}}{N_F}, n_{CP} = \frac{N_{CP}}{N_F}$$

If $\alpha = 1.5$, $N_F = 512$, $N_{FP} = 7$, $N_{CP} = 5$ and $n = 10$, $f_0 = 1.67(f_1 + f_2 + \ldots + f_n)$ Referring again to FIG. 1 the block indicated by reference numeral 10' is a channel stuff pulse adder. This is a circuit that generates a channel stuff pulse for time adjustment when one frame time of each channel is longer than the sum of the above-mentioned converted signals $g_1$, $g_2$ and $g_3$, and adds marks and/or spaces having the same consecutive number as that of the channel synchronizing signal $g_{21}$ or $g_{31}$, for example.

Figure 3:
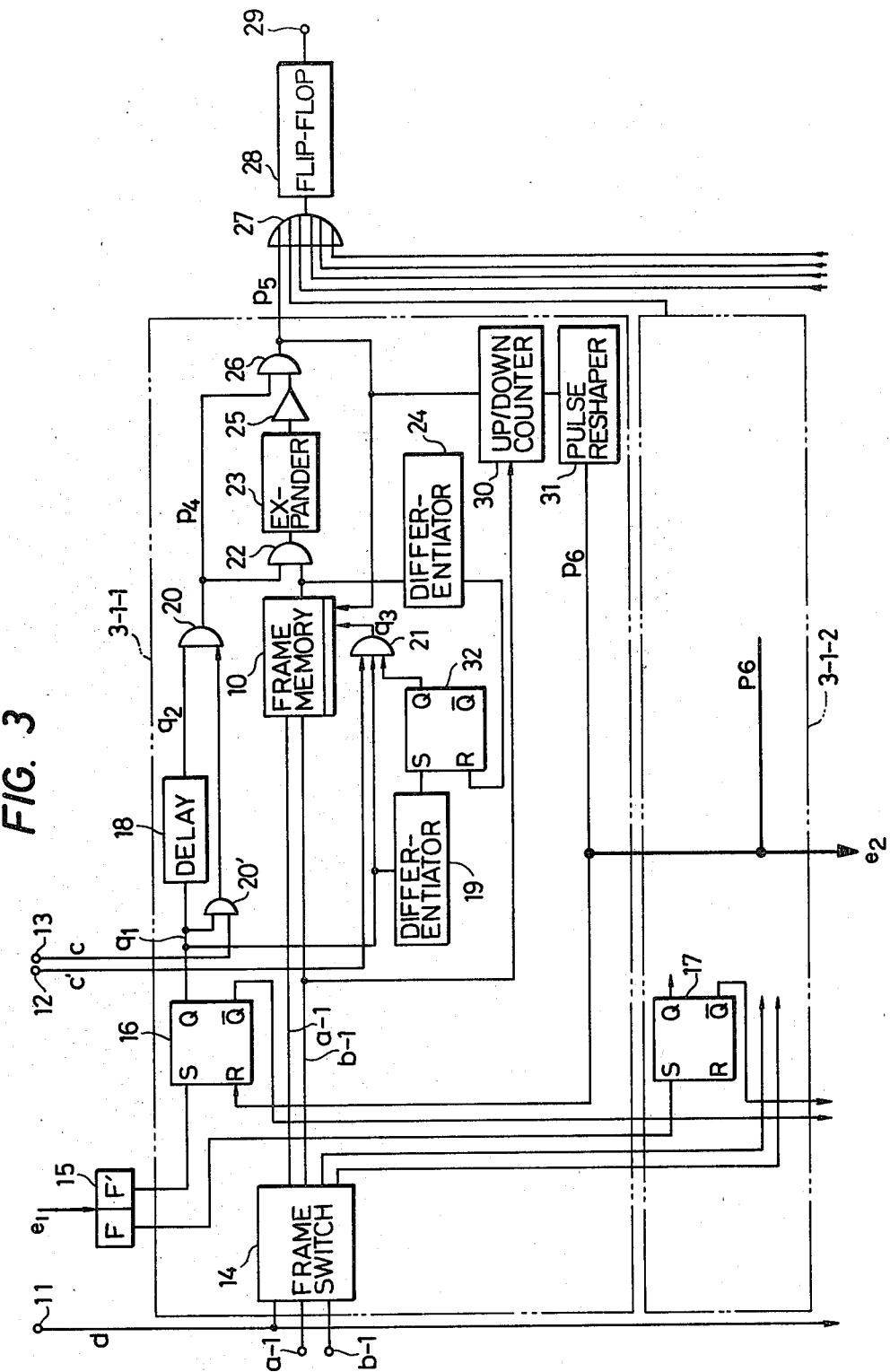
FIG. 3 is a block diagram of an embodiment of an encoder-multiplexing circuit to be used for the time division multiplexing system in accordance with the present invention.
Figure 4:
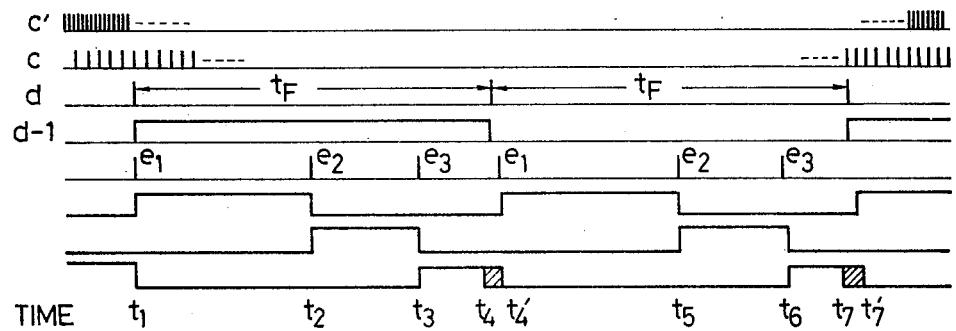
FIGS. 4 and 5 are time charts, useful for explaining the operation of the above-mentioned embodiment.

FIG. 3 is a block diagram showing the construction of an embodiment of the code converter (called herein a "local code converter") 3-1 for the first channel in the above-mentioned system of FIG. 1, and FIG. 4 is a time chart for explaining the operation of the converter. The local code converter 3-1 consists of two code converters 3-1-1 and 3-1-2 (the detailed construction of 3-1-2 is not specifically illustrated) each having substantially the same construction. Each code converter 3-1-1, 3-1-2 includes a memory 10, which may be provided in the form of a shift register, and alternately effects writing and coding of signals having one frame duration. That is to say, when the code converter 3-1-1 is effecting writing of one frame of data, the code converter 3-1-2 effects coding of the previously-stored frame. More specifically, when a frame control signal d and a channel control signal e are applied to the input terminal 11, the switching circuit 14 changes the flow of the signal a-1 and its clock signal b-1 from one code converter over to the other code converter, and the flip-flop 15 also changes the operation of the one code converter to a coding and read-out operation at the same time. This changeover operation is effected substantially every frame period, so that the code converter 3-1-1 will receive and store data while the code converter 3-1-2 reads out previously-stored data during one frame period and the two code converters will switch operations during the next frame period. For example, the switching circuit 14 changes the application of the signal a-1 and the clock signal b-1 over to the converter 3-1-1 for the time $t_1$-$t_4$ in the first frame $t_F$ and inhibits the flow of these signals to the converter 3-1-2 for the period of this frame. During this same first frame, the signal a-1 is stored in the memory 10, and the converter 3-1-2 encodes the signal which was stored in its memory 10 during the preceding frame.

During the writing of data into the memory 10, the clock signal b-1 is applied to the memory 10 to shift in the signal a-1 and is also applied to increment an up-down counter 30, which generates a count equal to the number of bits in the signal a-1 which is written into the memory 10 from that channel during the frame. In this regard, data will be applied to the frame memory 10 during the entire frame time; however, because the bit rates of the signals a-1, a-2 and a-3 are different, different numbers of pulses will be stored in the memories 10 of the respective local code converters during each frame, as seen in FIG. 2. The counter 30 in each converter will provide the means for keeping track of these bit number values in each respective local code converter.

Next, the coding operation, in which the signal a-2 stored in the memory 10 is encoded, will be explained with reference to FIG. 4. When the frame control signal d is applied to the input terminal 11 at the time $t_1$, the switching circuit 14 changes the signal a-1 and the clock signal b-1 over to the converter 3-1-2, and, at this time, the channel control signal $e_1$ sets a trigger flip-flop 15 so that F' is ON. The output of F' is applied to the set terminal of a set-reset flip-flop 16 (hereinafter called simply a "flip-flop"). Since the capacity of the memory 10 is selected so that it is considerably greater than the bit number of the one frame signal a-1 to accommodate signals having a wide range of bit rates, initialization of the memory must be effected in order to skip vacant memory locations and to establish the state in which reading can be effected immediately. An AND gate 21 is employed for effecting this initialization. From the input terminal 12 there is applied to respective inputs of gate 21 a signal C' having a clock rate which is significantly faster than that of the transmission clock rate, an output signal $q_1$ of a flip-flop 16, and an output signal of a flip-flop 32 that is set by a pulse obtained by detecting the leading edge of signal $q_1$ through a differentiator 19. After initialization is completed, an initialization pulse is detected by a differentiator 24 in a manner which will be described later, and the flip-flop 32 is reset by the detected output.

Figure 5:
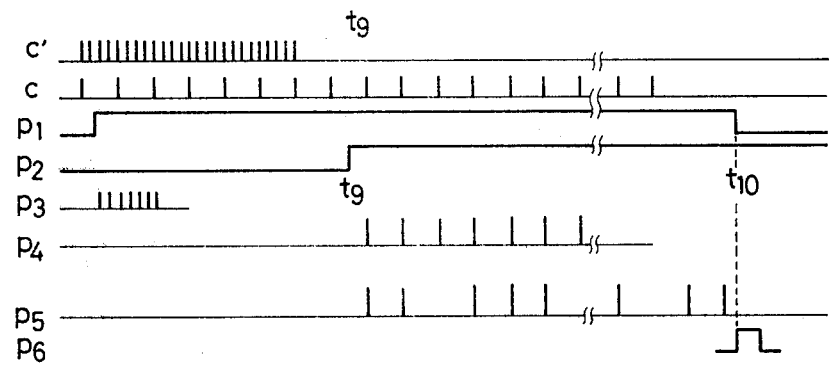

FIG. 5 is a time chart diagram which is useful for explaining the initialization part of the operation and the encoding part of the operation that will be described hereinafter. As shown in the diagram, the output $P_1$ of the flip-flop 32 is turned ON simultaneously with the rise of the output signal $q_1$ of the flip-flop 16 and allows the passage of a fast clock signal $P_3$ by the gate 21. By the above-mentioned output $q_3$ (which is the same as $P_3$) of the AND gate 21, the data in the memory 10 is rapidly shifted to effect initialization. When a pulse representing the start ("1" after continuation of "0", for example) is generated at the output of the memory 10, its rise is detected by the differentiator 24. The flip-flop 32 is then reset, and the scanning of the memory 10 stops after the first signal within the frame has been shifted to the extreme right position.

Next, the coding part of the operation will be described. The output signal $q_1$ of the flip-flop 16 is delayed by a delay circuit 18 by seven time slots to produce the time width of the frame synchronizing signal $g_{11}$ in FIG. 2 (or five time slots in the local converters 3-1 and 3-3 to produce the time width of the channel synchronizing signal) and is converted into a signal $q_2$. The signal $q_2$ and the transmission clock signal C that is applied to the input terminal 13 are applied to respective inputs of an AND gate 20. The output $p_4$ of this AND gate 20 is applied as one input to AND gates 22 and 26. The output of the above-mentioned memory 10 is applied to the other input terminal of the AND gate 22, and the output of this AND gate 22 is applied to the other input terminal of the AND gate 26 via a pulse width expander 23 and an inverter 25. The pulse width expander 23 expands the input pulse to a length which is 1.5 times the transmission clock period. The output of the AND gate 26 is applied on the one hand to an adder in the form of an OR gate 27, and is applied also to the afore-mentioned up-down counter 30 to decrease the count of the counter. However, it will be apparent that no transmission clock pulse occurs at the output of the AND gate 20 until the time point $t_9$ at which the output of the delay circuit 18 assumes a high level. In other words, no coding is effected before a frame or channel synchronizing signal is applied.

The clock pulse $P_4$ is applied to the AND gate 22 after the time point $t_9$. A pulse signal having a period twice that of the transmission clock occurs at the output of the trigger-type flip-flop 28 which is driven by the output of the AND gate 26 through the OR gate 27 when the bit to be read out from the memory 10 is "1", and a pulse signal having the same period as that of the transmission clock occurs when the bit to be read is "0", as shown at h in FIG. 2. In other words, when the information to be read from the memory 10 is "1", the AND gate 22 becomes conductive and the pulse passing through the gate 22 is expanded by the pulse expander 23 into a pulse with a width 1.5 times greater than that of the clock rate and is inverted by the inverter 25 to inhibit the gate 26. Hence, the passage of a succeeding clock pulse generated from the AND gate 20 through the AND gate 26 is blocked. Since the AND gate 26 becomes conductive when the third clock pulse arrives from gate 20, a pulse is generated and at the same time, a shift pulse is applied to the memory 10 from the output of gate 26, thereby again shifting the information to be read to the extreme right to read out the next bit. If the bit of the information to be read is "0", AND gate 20 being always conductive, a pulse occurs which has the same period as that of the transmission clock rate at the output of the AND gate 26. The portion of the time $t_9$-$t_{10}$ in FIG. 5 illustrates waveforms when the signals stored in the memory 10 are "0100 . . . 100", which corresponds to the channel signal a-1 in FIG. 2.

Now, when the digital signals of one frame previously stored in the memory 10 are all read out, the number of pulses generated from the AND gate 26 becomes equal to the maximum bit number stored in the counter 30 during the writing operation so that the count of the up-down counter 30 will have been decreased by that number. Thus, the counter 30 becomes 0 at this point, a coding terminating signal is generated therefrom, and this signal is passed through a pulse shaper 31 to be converted into a pulse $p_6$, which resets the flip-flop 16. As the feed of the clock pulse is blocked through the gate 20 by the now-blocked gate 20', coding is stopped and at the same time, the pulse $p_6$ is applied as a coding start signal $e_2$ of the local code converter 3-2 of the second channel. In the same way, coding is effected in the local code converter 3-3 of the third channel in response to generation of the coding start signal $e_3$ in the local code converter 3-2, after which, a stuff pulse to be later described is added. The next frame signal is generated at this point so that coding is then effected by the code converter 3-1-2 of the local code converter 3-1 of the first channel during the time $t_e$-$t_5$ of FIG. 4 in a subsequent frame, in the same way as the code converter 3-1-1.

Thus, the read-out of data from the local code converters 3-1, 3-2 and 3-3 proceeds in sequence with the sequential generation of the start signals $e_1$, $e_2$ and $e_3$, with one converter not beginning its read-out operation until the previous converter has completed read-out of all of the data stored in its memory. In this way, a self-synchronizing multiplexing of the data is effected without regard to the bit rates of the input signals a-1, a-2 and a-3.

Figure 6:
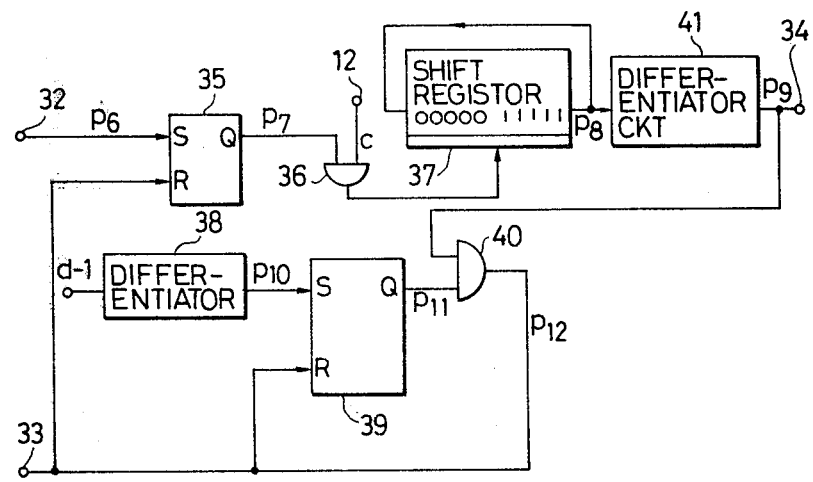
FIG. 6 is a circuit diagram of a stuff pulse generation circuit to be employed for the embodiment shown in FIG. 1.
Figure 7:
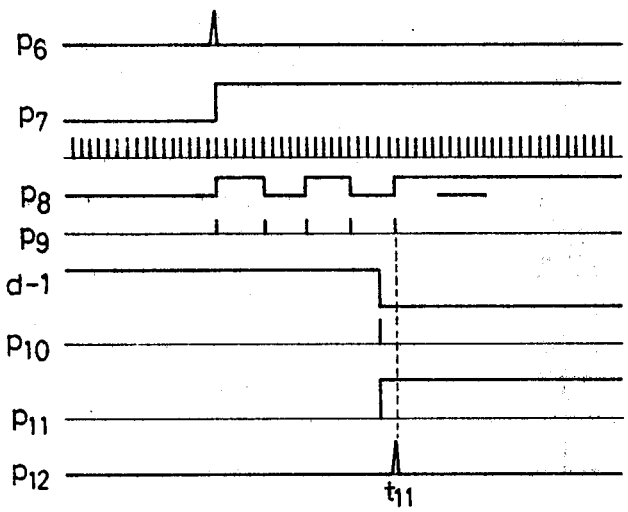
FIG. 7 is a time chart useful for explaining the operation of the above-mentioned stuff pulse generation circuit.

Generally, the frame period (time $t_F$ of FIG. 4) is set greater than the sum of the coding times of the channels for design convenience. Accordingly, it sometimes happens that the subsequent frame signal d is not generated even when coding of the final channel is completed. It is therefore necessary to fill this gap by a pulse (stuff pulse) which can be distinguished from the information signal. FIG. 6 shows a circuit diagram of an embodiment of a stuff pulse addition circuit or generator 10' for this purpose, and FIG. 7 shows the waveforms which relate to the operation of this circuit.

An end signal $P_6$, which is generated by the pulse reshaper 31 (FIG. 3) when coding of the final channel of one frame is completed, is applied to the set terminal of a flip-flop 35 via an input terminal 32 and renders an AND gate 36 conductive. The AND gate 36 allows the passage of a transmission clock pulse C applied from the input terminal 12, which operates to sequentially shift the contents of a shift register 37. The shift register 37 stores 10-bit information, i.e., "0000011111", which is circularly shifted by the output clock signal of the above-mentioned AND gate 36. When this waveform is passed through a differentiator circuit 41, a pulse $P_9$ having a period five times that of the transmission clock is generated at the output terminal 34, which is applied to the multiplexer 5 as seen in FIG. 1. On the other hand, a signal $P_{10}$ is applied to the set terminal of a flip-flop 39 from the output of a differentiator circuit 38 which is connected to receive the frame control signal d-1 of FIG. 4 from terminal 11. Accordingly, after the time $t_{11}$ when the AND gate 40 becomes conductive with the setting of flip-flop 39, it allows the passage of an output pulse $P_9$ of the differentiator circuit 41 that is next generated, and the resulting pulse $P_{12}$ resets the flip-flops 35 and 39 and effects the first coding of the subsequent frame. The coding start signal $e_1$ of the code converter of the channel is produced via the output terminal 33 and is applied to flip-flop 15 in FIG. 3. If there is a sufficient time from the finish of coding of one frame till the start of coding of a subsequent frame, a pulse having a period five times that of the transmission clock is inserted as a stuff pulse, thereby controlling the time. This plays an important role for the transmission of a burst signal as will be later described.

Figure 8:
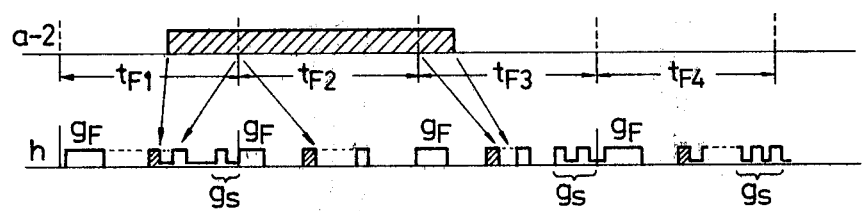
FIG. 8 is a diagram useful for explaining the processing procedure for burst signals.

FIG. 8 is a time chart for explaining the case when the signal to be transmitted is a burst signal. For the convenience of explanation, it will now be assumed that a burst signal is allocated to the second channel of FIG. 1 (though they are actually digital signals consisting of "0" and "1" bits, they are represented by oblique lines for the sake of simplicity) and this occurs in a period included in a three-frame interval. When these signals are subjected to time division multiplexing in the above-mentioned embodiment, they are converted into a signal h as shown in the drawing. Symbol $g_F$ represents a frame synchronizing signal and a pulse represented by oblique lines is a channel synchronizing signal of the second channel. Since the time interval occupied by the burst signals is small in the frames $t_{F1}$ and $t_{F3}$, a time is left when coding of the three channels is finished so that the afore-mentioned stuff pulse $g_s$ is added. In the frame $t_{F4}$, there is no channel signal a-2 so that the channel synchronizing signal of the second channel and that of the third channel occur consecutively, and a stuff pulse $g_s$ occurs in succession to the coding signal of the third channel.

Figure 10:
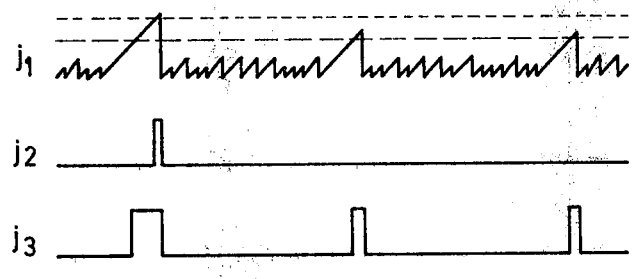
FIG. 10 is a time chart useful for explaining the operation of a synchronizing separation circuit in the above-mentioned demultiplexing circuit.
Figure 9:
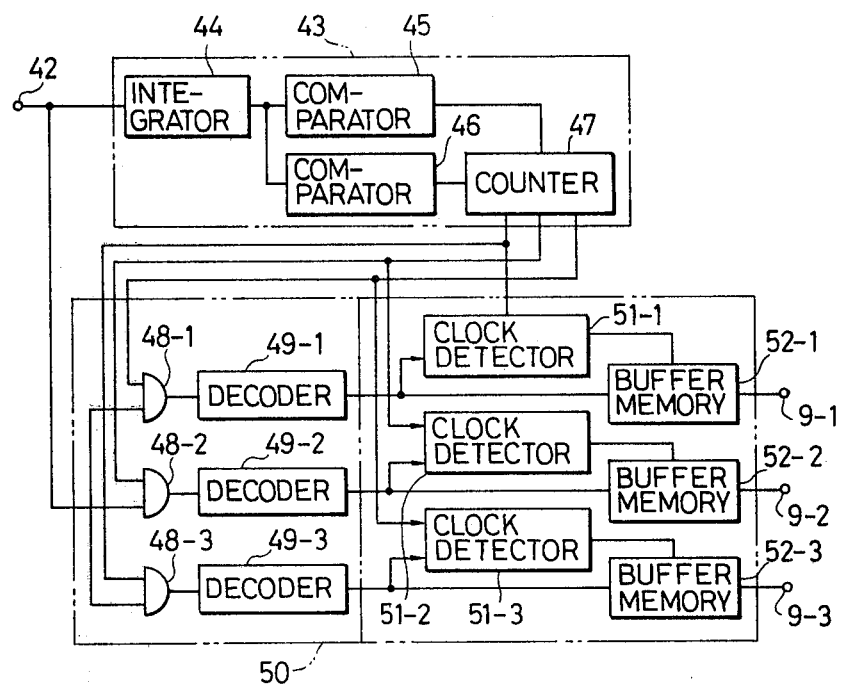
FIG. 9 is a block diagram showing the construction of a demultiplexing circuit to be used for the time division multiplexing system in accordance with the present invention.

FIG. 9 shows the construction of a decoder 8 in FIG. 1 for the signal that is subjected to time division multiplexing in the above-mentioned manner. A part of the multiplexed signal received at the input terminal 42 is applied to a synchronizing signal separation circuit 43. As its operating waveform is shown in the time chart of FIG. 10, the synchronizing signal separation circuit 43 performs integration by means of an integrator 44 using the leading or trailing edge of the input pulse as the starting points. The integrated signal $j_1$ is applied to first and second comparators 45 and 46 having different threshold levels from each other thereby to obtain signals $j_2$ and $j_3$, respectively. In other words, the signal $j_2$ is separated as a frame synchronizing signal, and the signal $j_3$ as a channel synchronizing signal. These signals are applied to a counter 47 and allow it to generate gate driving signals for AND gates 48-1, 48-2 and 48-3 that together form a decoder 50. Namely, when the signal $j_2$ is applied, the AND gate 48-1 becomes conductive and as the pulse signals $j_3$ are sequentially applied, the AND gates 48-2 and 48-3 are sequentially actuated. As the afore-mentioned stuff pulse is added, the pulse $j_3$ is sequentially applied after the AND gate 48-3 corresponding to the last channel is actuated. However, since the output of the counter 47 does not vary, no change occurs in the decoding operation. Circuits 49-1, 49-2 and 49-3 are used for converting the signal of each channel demultiplexed by the above-mentioned AND gates, into the original signal. This conversion circuit can be realized by various constructions.

In the case where the signal is converted in accordance with the rules of the code converter 3 in the above-mentioned embodiment, the signal can readily be converted into the original signal a by adding the output signal of the AND gate 48 to the signal delayed by one time slot of the above-mentioned transmission clock. This demultiplexed and reconverted signal can be used directly as a decoded signal, but when it is necessary to convert it into pulses with equal repetition periods, such as the pulses a-1, a-2 and a-3 in FIG. 2, the channel signals a-1, a-2 and a-3 of FIG. 2 can be reproduced from the output terminals 9-1, 9-2 and 9-3 by writing the output pulses of the above-mentioned converters 49-1, 49-2 and 49-3 to buffer memories 52-1, 52-2 and 52-3, respectively, extracting a clock signal for each channel by clock extracters 51-1, 51-2 and 51-3 to form read pulses, and reading each pulse from the above-mentioned buffer memories 52-1, 52-2 and 52-3.

Though the foregoing deals with exemplary embodiments in which multiplexing is effected in accordance with the number of consecutive pulses, it would be obvious to those skilled in the art that multiplexing can also be made by means of distinction using the amplitude or other ways. It would be easily understood also that the pulse train multiplexed in accordance with the present invention can be multiplexed with conventional signals with a straight binary format in the time division arrangement.

As described in the foregoing, the present invention provides revolutionarily-effective means for multiplexing various digital signals to cope with diversification of services in that asynchronous transmission signals as well as burst signals can be multiplexed and transmitted. Hence, drastic increases in the system flexibility and reduction of the transmission cost can be expected in accordance with the present invention.

We claim:

1. A time division multiplexing system comprising: a plurality of digital signal sources for providing a plurality of channels of digital data at mutually independent selected bit rates; time compression means including a plurality of converter circuits for compressing in time the digital signals of each channel for a given frame period to produce respective compressed data channels; time division multiplexing means for adding a frame synchronizing signal to the output of one of said converter circuits and a channel synchronizing signal to the outputs of the other ones of said converter circuits and for conducting time division multiplexing of the compressed data channels, including means for adding a stuff pulse to one of the multiplexed data channels so that the total duration time of said compressed data from all channels, said frame and channel synchronizing signals and the stuff pulse coincides with a transmission frame period; said converter circuits each including coding means for coding the output of said time compression means to convert said input digital signals into coded signals in which a mark and a space are designated by different pulse intervals; a transmission line for transmitting the output of said multiplexing means; and decoding means for decoding the time division multiplexed signal transmitted by said transmission line.

2. The time division multiplexing system as defined in claim 1, wherein said converter circuits each include means for converting each "1" and "0" of the digital data of each channel, the frame synchronizing signal and the channel synchronizing signal into pulse signals of two levels consisting of marks or spaces with durations which are an integral multiple of the transmission clock period, said marks or spaces having mutually-different consecutive numbers depending on corresponding signals.

3. The time division multiplexing system as defined in claim 2, wherein said converter circuits each include means for converting each "1" and "0" of the digital data of each channel into a pulse signal of a two-value level consisting of such a pulse combination that the consecutive number or marks or spaces are 1 (or 2) and 2 (or 1), respectively.

4. The time division multiplexing system as defined in claim 2, wherein said converter circuits each include first and second code conversion circuits, each having a frame memory, and a control circuit for changing over said first and second code conversion circuits between the writing operation of the digital signal of each channel to said frame memory and the converting operation of the written signal into a transmission code.

5. The time division multiplexing system as defined in claim 2, wherein said converter circuits include means for providing timing clock signals at a clock rate set in such a fashion as to satisfy the following relation:

$$N_F \geq \alpha \frac{f_1 + f_2 + \ldots + f_n}{f_0} N_F + N_{FP} + (n-1)N_{CP}$$

where n: number of plural channels,
$f_0$: transmission clock rate,
$f_1, f_2, \ldots f_n$: clock rate of signal in each channel,
$N_F$: number of transmission clock pulses in a frame,
$N_{FP}$: number of pulses of frame synchronizing signal,
$N_{CP}$: number of pulses of channel synchronizing signal,
α: increment ratio of clock rate due to code conversion.

6. A time division multiplexing system for multiplexing a plurality of input digital signals having mutually independent selected bit rates to produce a multiplexed output signal at a transmission bit rate which is higher than the bit rate of any of said input digital signals, comprising
clock generator means for generating clock signals at said transmission bit rate and frame signals;
a plurality of code converters, each connected to simultaneously receive a respective one of said input digital signals and including means for storage of said input digital signals during alternate periods between successive frame signals, means for reading-out the data stored in said storage means during the periods between said alternate periods at the rate of said clock signals and means for coding said data at the time of read-out from said storage means;
means for controlling the read-out of data in each code converter so that said code converts effect the read-out of data sequentially, including means responsive to the read-out of one frame of data in one code converter for generating a start signal initiating the operation of the reading-out means in another code converter; and
means for combining the outputs of said code converters.

7. A time division multiplex system according to claim 6, wherein said controlling means includes counter means in each code converter for counting up the number of bits stored by said storage means during each period in which data is stored thereby and for counting down in response to each bit read out of said storage means by said reading-out means and means responsive to an initial count of said counter means for generating said start signal.

8. A time division multiplex system according to claim 6, wherein said code converters are interconnected so that said start signals are applied from one code converter to the next in daisy-chain fashion.

9. A time division multiplex system according to claim 6, further including stuff pulse generator means responsive to the start signal in the last code converter to read out data during a read-out period for reading out a stuff pulse signal until the next frame signal is generated by said clock means.

10. A time division multiplex system according to claim 6, 7, 8 or 9, wherein said code converters are each provided as first and second converter units including storage means, reading-out means and coding means, and further including means responsive to said frame signals for enabling the writing of data into one unit while data is being read from the other unit during one period and for reversing this operation of the units during each succeeding period defined by said frame signals.

* * * * *